United States Patent Office 3,336,226
Patented Aug. 15, 1967

3,336,226
PHENOLIC POUR POINT DEPRESSANTS
George J. Kautsky, El Cerrito, and Andrew D. Abbott, Greenbrae, Calif., assignors to Chevron Research Company, San Francisco, Calif., a corporation of Delaware
No Drawing. Filed Dec. 28, 1965, Ser. No. 517,068
7 Claims. (Cl. 252—42.7)

This invention concerns trimeric alkylphenols having long chain alkyl substituents which are novel pour point depressants.

When using liquid hydrocarbons as lubricating oils and fuels, the hydrocarbon fluids should flow readily at low temperatures—less than 32° F. The flow of these fluids, particularly those with high wax contents, is very sensitive to low temperatures. Numerous materials have been employed and described to modify the crystallization of wax in hydrocarbon fluids and reduce the temperature at which they readily flow. Two major types have found wide acceptance. The first is a class of products obtained by alkylating naphthalene with chlorinated waxes; the second is a class of high molecular weight polymers of olefins, alkyl methacrylates, vinyl esters, alkylstyrenes and various copolymers.

The additives or pour point depressants do not reduce the amount of wax which crystallizes from the fluid but, rather, modify the surface of the wax by absorption or cocrystallization and reduce fluid occlusion by the crystals. This changes the wax-crystal structure and permits the fluid to flow.

It has now been found that good pour point depression can be obtained by using compositions comprising, for the most part, alkylphenol trimers having methylenic bridges and mono-substituted by alkyl of at least 14 carbon atoms and less than about 25 carbon atoms, more usually from about 15 to 22 carbon atoms. Not only may the trimeric alkylphenols be used, but also their lead and barium salts. The lead and barium cations may be present in from one to three equivalents per trimeric phenolic compound.

For the most part, the trimeric alkylphenols will have the following formula:

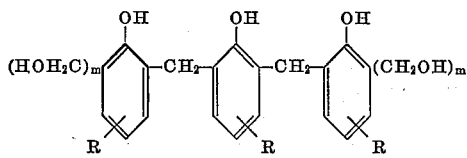

wherein R is an alkyl group of from about 14 to 25 carbon atoms, usually of from 15 to 21 carbon atoms, and m is 0 or 1.

While the above composition is the most probable one, other compositions may also be present. Minor amounts of dimeric and tetrameric phenol may be present and some attachment or bridging of the methylene at a para position may occur. An illustrative para bridging compound would have the following formula:

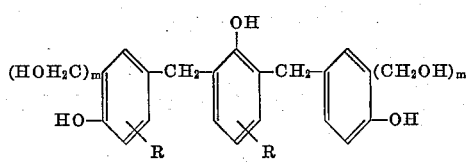

The alkylphenols may be prepared by alkylating phenol with olefins of from 14 to 25 carbon atoms using a Lewis acid catalyst and then reacting the alkylphenol with formaldehyde under basic conditions. Both the alkylation reaction and the reaction of formaldehyde with phenols under basic conditions are well known in the art.

In alkylating phenol, generally a mixture of ortho-, para- and meta-substituted products are formed. For the most part, the ortho and para product will initially predominate.

Various olefins may be used in alkylating the phenol. Either a single olefin or a mixture of olefins may be used. In the preparation of a pour point depressant, preferably, a mixture of 2 or more olefins in the designated carbon range will be used in alkylating the phenol. However, alkylphenols alkylated by individual single olefins in the indicated carbon atom range will work, and the most desirable olefin for alkylation then is octadecene. Other illustrative olefins include tetradecene, percadecene, hexadecene, heptadecene, nonadecene, eicosene, docosene, etc. Either terminal olefins or internal olefins may be used. Preferred are the terminal olefins. Various catalysts include acidic clays, sulfuric acid, $BF_3$ complexes, etc. The reaction may be carried out neat or in solvents and generally at temperatures in excess of 50° C.

In preparing the trimer, formaldehyde and the alkylphenol are combined in the presence of a metal hydroxide, such as an alkali metal hydroxide or barium or lead oxide or hydroxide—when the latter salts are desired—and the mixture heated above 150° F. for a sufficient time. The free alkylphenol trimer may then be obtained by acidification.

The following examples are offered by way of illustration and not by way of limitation.

EXAMPLE A.—PREPARATION OF ALKYLPHENOL

A mixture of 1,350 parts of phenol, 1,740 parts of 1-olefins of from about 15 to 20 carbon atoms* and 186 g. of Filtrol 20 clay was heated to 300° F. for 3 hours After cooling to 190° F., the mixture was filtered and the filtered product stripped in vacuo at about 400° F. Analysis: boiling range (ASTM D 447)—640° to 688° F.; hydroxyl number (acetic anhydride)—149 (equivalent weight—376); weight percent oxygen—4.58.

Using infrared NMR analysis, the reaction product was found to be about 60 wt. percent ortho-alkylphenol and 40 wt. percent para-alkylphenol.

*$C_{15-20}$

| No. of carbon atoms: | Mole percent |
|---|---|
| 14 | 1 |
| 15 | 12 |
| 16 | 19 |
| 17 | 18 |
| 18 | 18 |
| 19 | 17 |
| 20 | 14 |
| 21 | 1 |
| 1-olefin | 94 |
| Straight chain | 86 |

*Example I*

Five hundred g. of the alkylphenol prepared above and 5 g. of sodium hydroxide were heated together at 200° F. for 45 minutes. The resulting sodium salt was cooled to 100° F. and 34.6 g. of paraformaldehyde was added. The reactants were heated slowly to 230–240° F. while distilling off the water that was formed. The resulting product was then dissolved in a mixed aliphatic/aromatic thinner and the solution washed with 1:1 volume mixture of concentrated hydrochloric acid and distilled water. The organic solution was then repeatedly washed with distilled water until neutral to methyl orange. The thinner was removed in vacuo at a temperature of 300° F. and the resulting product was filtered.

The filtered product was then dissolved in benzene and methanol added. Molecular weight analysis (Thermo- NAM) indicated the product was mainly an alkylphenol trimer.

Example II

The trimeric methylene-bridged alkylphenol (30 g.) prepared in Example I was heated with 8.7 g. of litharge in the presence of 10 g. of glycol at a temperature of 65° C. for 1 hour. The product was then dissolved in a mixture of toluene and benzene and filtered through Celite.

Example III

Using the method described in Example A, an alkylphenol was prepared with an olefin fraction of 15 to 17 carbon atoms obtained from cracking wax. The alkylphenol thus prepared (50 g.) and phenol were mixed with 5.8 g. of paraformaldehyde, 46.9 g. of barium hydroxide octahydrate and 6.8 g. of glycolic acid. The mixture was held at a temperature of about 85° C. for about 2 hours, then added to benzene and the resulting mixture refluxed to remove water. The product was recovered and redissolved in benzene-toluene and then filtered through Celite.

Example IV

Following the procedure of Example I, using the alkylphenol described in Example III, 30 g. of the methylene-bridged phenol trimer, 60 g. of benzene and 27 g. of barium hydroxide octahydrate were heated to a temperature of 60° C. for 1 hour. The temperature was raised to 120° C. for 1 hour and the water distilled off. The product was then dissolved in benzene-toluene and filtered through Celite.

The phenolic compounds of this invention can be used with a wide variety of products, either fuels or lubricating oils which require the lowering of their pour points. Both naturally derived and synthetic hydrocarbon and nonhydrocarbon fuels or lubricating oils may be used in conjunction with the phenolic compounds of this invention. Naturally derived oils include naphthenic base, paraffin base, asphaltic base or mixed base oils, which may be waxy or partially dewaxed. Synthetic oils may be derived by the polymerization of olefins, in the range from 6 to 12 carbon atoms and preferably 8-carbon straight chain hydrocarbons, polymerized with either Friedel-Crafts catalysts, such as aluminum chloride, or a Ziegler-type catalyst, normally consisting of a trialkyl aluminum mixed with a salt, preferably a chloride of a metal belonging to Group IV of Mendeleeff's Periodic Table, e.g., titanium.

Generally, at least about 0.05, and more usually at least about 0.1 weight percent of the phenolic compounds will be used for pour point depression. Usually, not more than 5 weight percent and generally not more than 1 weight percent of the phenolic compounds will be used as pour point depressants.

The pour point depressants of this invention are found to be effective in the presence of a wide variety of other additives. Important to this invention is the pour point depressant activity of the phenolic compounds in the presence of detergents, particularly lubricating oil detergents: alkaline earth metal sulfonates, alkaline earth metal phenates and alkenyl succinimides. The lubricating oil detergents are generally present in an amount of from 0.5 to 10 weight percent. Other additives may also be included such as rust inhibitors, oiliness agents, dyes, etc.

In order to demonstrate the effectiveness of the phenolic compositions of this invention as pour point depressants, the compounds prepared were tested according to ASTM D 97-57 using a variety of base lubricating oils and fuels. The following table demonstrates the results.

TABLE I

| Additive | Petroleum Oil Conc., wt. percent | Light Cycle Oil [1] | Light Cycle Oil [2] | Summer Diesel Fuel [3] | Winter Diesel Fuel [4] | 130 Neutral Oil | Cit-Con 100 N Oil | Cit-Con 200 N Oil |
|---|---|---|---|---|---|---|---|---|
| None | | −10 | −10 | +15 | +5 | +10 | +10 | +10 |
| Ex. I | 0.05 | −65 | −25 | −15 | −20 | −10 | −25 | |
| | 0.15 | −80 | −45 | −25 | −35 | −20 | −25 | 0 |
| | 0.30 | | | | | | −35 | −25 |
| Ex. II | 0.05 | −15 | −30 | −20 | | | | |
| | 0.10 | −80 | −40 | −30 | | | | |
| Ex. III | 0.05 | −15 | −20 | −5 | −15 | | | |
| | 0.10 | −20 | −25 | −20 | −15 | | | |

[1] Hydrofined Light Cycle Oil—API Gravity 31.3°; Boiling Range 346–603° F.; Paraffins and Naphthenes 50%; Olefins 10%; Aromatics 40%.
[2] Caustic Washed Light Cycle Oil—API Gravity 24.4°; Boiling Range 412–600° F.; Paraffins and Naphthenes 15%; Olefins 17%; Aromatics 68%.
[3] API Gravity 38.3°; Boiling Range 346–680° F.; Paraffins and Naphthenes 80%; Olefins 0%; Aromatics 20%.
[4] API Gravity 39.4°; Boiling Range 352–660° F.; Paraffins and Naphthenes 80%; Olefins 0%; Aromatics 20%.

It is evident that the phenolic compositions of this invention provide excellent pour point depression for a wide variety of lubricating oils and fuels, both with compounded and uncompounded oils and fuels.

As will be evident to those skilled in the art, various modifications on this invention can be made or followed, in the light of the foregoing disclosure and discussion, without departing from the spirit or scope of the disclosure or from the scope of the following claims.

We claim:

1. A lubricating oil composition comprising a waxy or partially dewaxed oil of lubricating viscosity and in an amount sufficient to reduce the pour point, a compound of the formula:

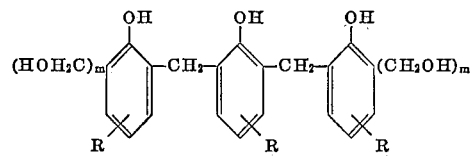

or its lead and barium salts, wherein R is an alkyl group of from 14 to 25 carbon atoms and $m$ is 0 or 1.

2. A lubricating oil composition according to claim 1, wherein R is of from 15 to 22 carbon atoms.

3. A lubricating oil composition according to claim 1, wherein said compound is the lead salt, having from 1 to 3 equivalents of lead cation.

4. A lubricating oil composition according to claim 1, wherein said compound is the barium salt, having from 1 to 3 equivalents of barium cation.

5. A fuel composition comprising a waxy or partially dewaxed hydrocarbonaceous fuel and in an amount sufficient to reduce the pour point, a compound of the formula:

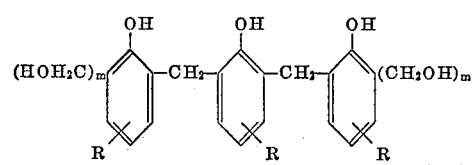

or its lead salt, wherein R is an alkyl group of from 14 to 25 carbon atoms and $m$ is 0 or 1.

6. A fuel composition according to claim 5, wherein R is of from 15 to 22 carbon atoms.

7. A fuel composition according to claim 5, wherein said compound is the lead salt, having from 1 to 3 equivalents of lead cation.

References Cited

UNITED STATES PATENTS

| | | | |
|---|---|---|---|
| 2,062,676 | 12/1936 | Reiff | 252—52 |
| 2,526,490 | 10/1950 | Lieber | 252—52 |
| 2,647,873 | 8/1953 | Matthews et al. | 252—42.7 |
| 2,760,852 | 8/1956 | Stevens et al. | 44—78 |

OTHER REFERENCES

Derwent: Belgian Patents Report, vol. 66A, July 15, 1960, page A13.

DANIEL E. WYMAN, *Primary Examiner.*

C. F. DEES, *Assistant Examiner.*